Patented May 11, 1926.

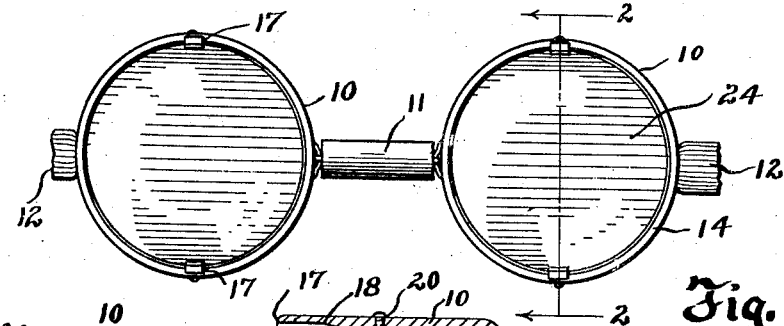
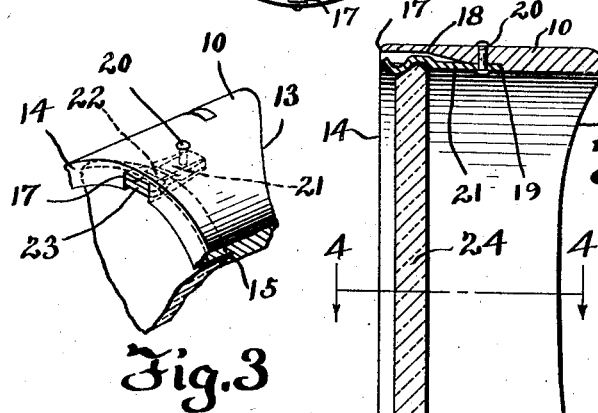
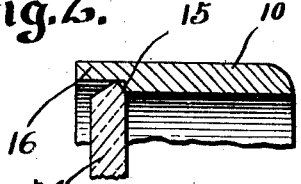
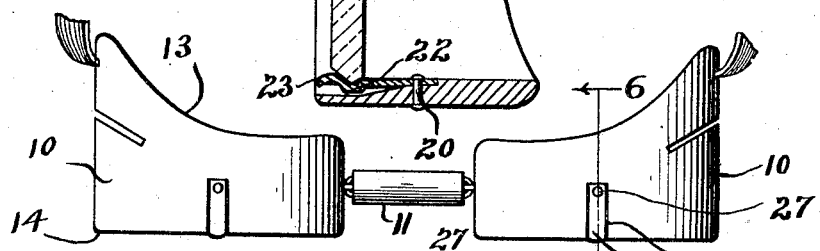
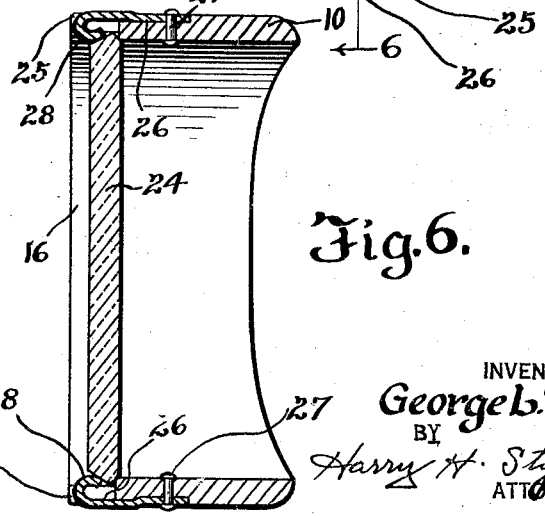

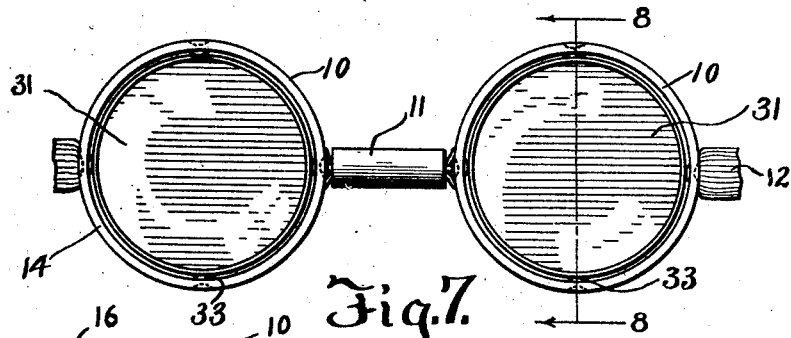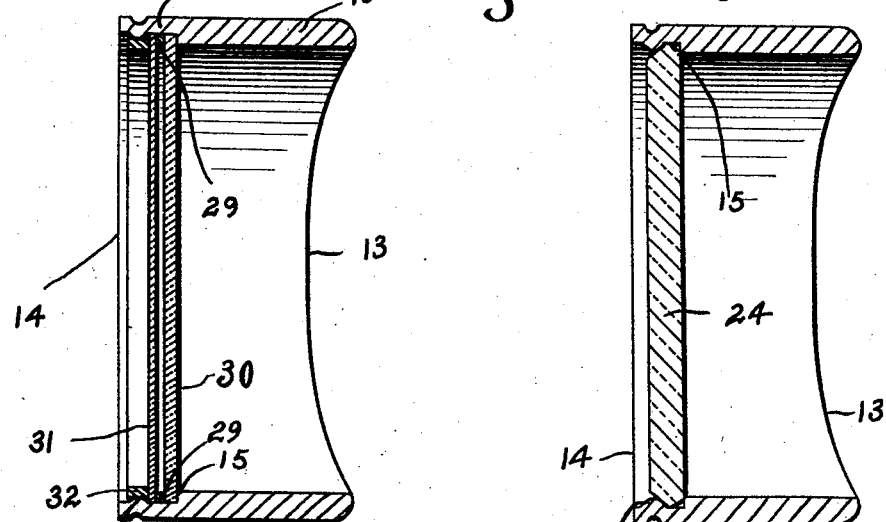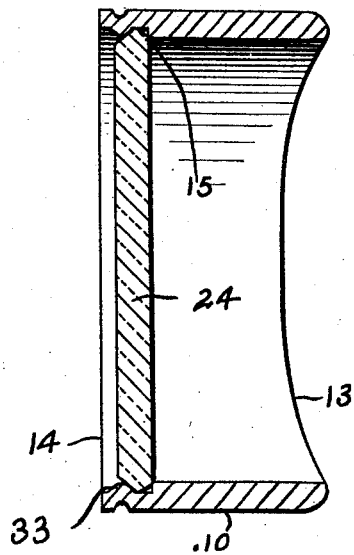

1,584,259

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed January 20, 1925. Serial No 3,570.

My invention relates to new and useful improvements in goggles and has particular reference to improved means for securing lenses in the eyecups of goggles.

It is a most important object of my invention to provide in the eyecups of goggles, lens clamping means, which, while firmly and securely clamping the lenses, will nevertheless permit of the easy and rapid insertion or removal of the same.

In the commercial use of goggles in factories and similar industrial plants, there has constantly been a demand for means for detachably clamping lenses in the eyecups of the goggles. Manufacturers frequently desire to replace the ordinary plain glass lenses usually furnished in goggles by lenses having certain properties particularly applicable for their particular business, or else they are constantly forced to replace old lenses chipped or scratched by flying chips of metal or the like with new lenses. It is therefore a most important object of my invention to provide a goggle in which it will be an easy and simple matter to insert or remove lenses.

Prior to my invention there have been a great many attempts made to produce an eyecup for goggles which shall have means for detachably clamping lenses. In so far as I am aware, however, all of these structures have included comparatively complicated structures, not only requiring considerable skill to insert or remove the lenses but also greatly increasing the original cost of the goggles. It is therefore, another important object of my invention to provide lens clamping means for the eyecups of goggles which shall be cheap to manufacture, easy to use, and of the utmost simplicity in every detail.

My invention further contemplates the provision of lens clamping means for the eyecups of goggles which shall be substantially hidden from view when the goggles are being worn, such that they will detract in no way from the good appearance of the goggle.

Other objects and advantages of my invention shall become apparent during the course of the following description taken in connection with the accompanying drawing, wherein like numerals are used to designate corresponding parts throughout all views of the same.

In the accompanying drawing forming a part of this specification and in which I have shown the preferred embodiments of my invention,—

Figure 1 is a front elevation of a pair of goggles embodying one form of my invention, Figure 2 is a transverse sectional view taken thru one of the eyecups on the line designated as 2—2 in Figure 1, Figure 3 is a detailed perspective view of a portion of one of the eyecups showing a lens clamping clip mounted therein, Figure 4 is a sectional view taken on line 4—4 of Figure 2, Figure 5 is a top plan view of a pair of goggles embodying a modified form of my invention, Figure 6 is a transverse sectional view taken on line 6—6 of Figure 5, Figure 7 is a front elevation of a pair of goggles embodying still another form of my invention, Figure 8 is a transverse sectional view taken on line 8—8 of Figure 7, Figure 9 is a transverse sectional view of an eyecup embodying still another form of my invention, and Figure 10 is a transverse sectional view of an eyecup embodying a fifth form which my invention may assume.

Referring now particularly to the drawing wherein I have shown the preferred forms which my invention may take, the numeral 10 designates a pair of eyecups joined as is customary with a nosepiece 11, and being further provided with the temple pieces 12. These eyecups 10 are substantially cylindrical in shape, having one edge curved as at 13 to conform to the contour of the face, and the opposite edge flat as at 14, for the reception of a lens.

In forming an eyecup in accordance with the preferred embodiment of my invention, I internally bore the same as from the edge 14, to form an annular lens receiving shoulder 15, on the inner periphery of the eyecup, the same being spaced from the edge 14 by an annular reduced portion 16. At certain predetermined points on the inner periphery of the annular reduced portion 16 and preferably at diametrically opposite points, I form transversely extending grooves 17, cutting the same substantially deep to a point 18, from which point I slowly taper the depth of the grooves to a point 19 located on the inner periphery of the eyecup and substantially beyond the annular shoulder 15.

Mounted in the wall of the eyecup 10 by a rivet 20, or any other suitable means and fitting snugly into the reduced portion of the transversely extending groove 17, is a resilient clip 21. As clearly shown in Fig. 2 of the drawing, this clip extends upwardly towards the edge 14 of the eye cup 10, and is bent as at 22 to form a U-shaped lens receiving catch, the outer arm of which is enlarged to form a spring lip 23.

While the normal position of the spring clip 21 is as shown in Fig. 2 of the drawing, it may be clearly seen that, due to the depth of the groove 17, the clip 21 may be depressed sufficiently to permit of the insertion of a lens, such as 24, past the enlarged lip 23 and into the U-shaped portion of the clip 22.

A lens once positioned in this U-shaped portion of the clip 21 will rest upon the shoulder 15 formed on the inner periphery of the eyecup 10 and will be held from displacement by the inherent resiliency of the spring clip 21. In order to remove the lens 24 from the eyecup, 10, it is only necessary to either depress this spring clip 21 by pressing on the outer lip portion 23, thus disengaging the edge of the lens 24 from the U-shaped portion of the clip 21 or else to exert sufficient pressure on the inner face of the lens 24 at a point opposite one of the clips 21, to force the same upwardly and outwardly past the catch 22 which may be forced back into the groove 17 providing sufficient pressure is applied.

In Figs. 5 and 6 of the drawing, I have shown a modified form of my invention, in which the annular reduced portion 16 is cut thru at two points to form the cut out portions 25. In this form of my invention, a spring clip 26 is riveted as at 27, to the outer periphery of the eyecup 10 being preferably partially buried therein so as to be even with the face thereof. This clip 26 extends upwardly on the outside of the eyecup 10 substantially to the edge 14 where it is bent inwardly and downwardly to form a hook section 28. In use, this hook section 28 is adapted to bear upon the edge of a lens 24, positioned on the annular shoulder 15 and to clamp a lens in this position due to its inherent resiliency.

While inserting or removing a lens from this form of eyecup, it is obvious that the clip 26 will be forced outwardly thru the opening in the annular reduced portion 16 and beyond the plane of the outer periphery of the eyecup. In this form of my invention, the clip 26 is capable of greater lateral movement than is the clip in the preferred embodiment of my invention, but lacks the advantage of being as well protected.

In Figs. 7 and 8 of the drawing, there is shown still another form which my invention may take. In practice I construct my eyecup from a resilient fiber composition material, which is inherently resilient and from which projecting parts may be formed which shall act as spring clips. In this form of my invention, the eye cups 10 are likewise internally bored from the edge 14, to form an annular lens receiving shoulder 15 and an annular reduced portion 16.

In Fig. 8 of the drawing I have shown seated on the annular lens receiving shoulder 15, a lens such as 30 which may either be a lens ground to some particular power or one having certain properties particularly applicable for the specific use to which it is to be put, the same being protected by a protection lens 31, spaced from the lens 30 by means of an annular fibre washer 29. In order to prevent the outward movement of these lenses, I have provided an annular resilient clamping ring 32, adapted to bear against the annular reduced portion 16 of the eye cup 10 sufficiently to be clamped therein and hold the lenses against the shoulder 15. To make more positive the clamping action of this annular clamping ring 32, I have provided in the annular reduced portion 16, a plurality of displaced portions 33, which due to the inherent resiliency of the material from which the eye cup is made, form resilient projections bearing firmly against the annular ring 32 but capable of being depressed to permit of the removal of the ring and subsequently the removal of the lenses.

In Fig. 9 of the drawing, I have shown a single lens such as 24, seated on the annular lens receiving shoulder 15, and held from outward movement by a plurality of displaced portions 33. In this form of my invention, wherein a single lens is used, the annular resilient ring 32 may be discarded in that the displaced portions 33 form resilient projections past which the lens 24 may easily be forced into position on the annular shoulder 15 although preventing the accidental outward movement or displacement of the same.

In Fig. 10 of the drawing, I have shown still another modified form of my invention in which the annular shoulder 15 is eliminated and in which a plurality of displaced portions 34 are substituted. In this form of my invention I provide the displaced portions 34 at certain predetermined points on the inner periphery of my eye cup permitting the same to form a stop to prevent the movement of the lens 24 towards the rear or the curved edge 13. As in the other form of my invention, I provide displaced portions 33 adjacent the edge 14 of my eye cup for detachably clamping the lens and preventing the same from any outward movement.

From the foregoing description it will be seen that I have provided lens retaining means for the eye cups of goggles which will permit of the ready insertion or removal of the lenses, and in addition that I have provided lens retaining means for eye cups which will securely and firmly hold lenses from displacement under all ordinary conditions.

It will further be seen that eye cups constructed in accordance with my invention shall not only be exceedingly simple and unencumbered with useless lens clamping structures, but also will be cheap to manufacture and easy to use.

In addition to an eye cup that will answer the requirements of all commercial demands for goggles, I have produced an eye cup which will be equally applicable and useful to the average person who desires a pair of goggles for automobile driving or similar unindustrial uses. While I have shown and described certain preferred forms which my invention may take, it is to be understood that I reserve the right to make certain minor departures and variations therefrom in so far as I remain within the spirit of my invention and scope of the appended claims.

Having thus described my invention what I claim is:

1. The combination in an eye cup of an annular shoulder adjacent one edge, an annular reduced portion, provided with a plurality of transversely extending grooves, intermediate the annular shoulder and the edge, a spring clip mounted in each groove and a U-shaped catch formed in each clip.

2. An eye cup having an annular shoulder adjacent one edge, an annular reduced portion, having cut out sections intermediate the annular shoulder and the edge, and a plurality of resilient clips, mounted adjacent the annular shoulder and projecting into the cut out sections of the annular reduced portion for clamping a lens on the shoulder.

3. An eye cup having an annular shoulder adjacent one edge, an annular reduced portion having cut out sections intermediate the annular shoulder and the edge and a plurality of resilient clips mounted adjacent the annular shoulder, the same being bent to form lateral projections adjacent the cut out sections of the annular reduced portion for clamping a lens on a shoulder.

4. The combination in an eye cup of an annular shoulder adjacent one edge, an annular reduced portion having a plurality of cut out sections intermediate the annular shoulder and the edge, a plurality of spring clips riveted to the wall of the eye cup adjacent the annular shoulder and a lens clamping catch formed in each clip normally held above the lens for clamping the lens on the same but adapted to be forced into the cut out sections formed in the annular reduced portion to remove the catch from above the lens for releasing the lens.

5. In a device of the character described, a lens having a lens rest and a resilient portion having a portion inclined towards the center of the rim and a portion inclined away from the center of the rim, the point of intersection of the inclined portions overlying the edge of the lens when in place on the lens seat, the outer inclined portion being adapted to act as a cam to force the resilient portion out of the way to enter the lens on the lens rest and the inward inclined portion to act as a cam to force the resilient member out of the way to remove the lens from the lens seat, said cam portions being operated through pressure by contact with the edge of the lens.

6. In a device of the character described, a lens rim having a lens rest and a resilient tongue adjacent the lens rest having a cam face comprising an inwardly inclined portion and an outwardly inclined portion, the point of intersection of the inclined portions overlying the lens when in place on the lens seat, said inclined faces acting to force the tongue out of the way of the lens by pressure of the lens when entering or being removed from the rim.

7. In a device of the character described, a lens rim having a lens seat, a resilient tongue secured to the rim adjacent the seat and having an inwardly and outwardly inclined cam face projecting over the lens when the lens is in place on the seat, said inclined faces acting to force the tongue out of the way of the lens by pressure of the lens when entering or being removed from the rim.

8. In a device of the character described, a lens rim having a lens seat and a recessed portion adjacent the lens seat, a resilient tongue secured in the recess in the rim and having an inwardly and outwardly inclined cam face projecting over the lens when the lens is in place on the lens seat, said inclined faces acting to force the tongue out of the way of the lens by pressure of the lens when entering or being removed from the rim.

9. In a device of the character described, a lens rim having a lens seat, and a resilient portion adjacent the lens seat having an inwardly and outwardly inclined cam face projecting over the lens when the lens is in place on the lens seat, said inclined faces acting to force the tongue out of the way of the lens by pressure of the lens when entering or being removed from the rim.

10. In a device of the character described, a lens rim having a lens seat, a resilient portion adjacent the lens seat having an inwardly and outwardly inclined cam face projecting over the lens when the lens is in place on the lens seat, said inclined faces acting to force the tongue out of the way of the lens by pressure of the lens when entering or being removed from the rim, and a lens having a bevelled edge adapted to operate the cam tongue when it is being entered or removed from the rim.

GEORGE L. TULLY.